US010944617B2

(12) United States Patent
de Ruijter et al.

(10) Patent No.: US 10,944,617 B2
(45) Date of Patent: Mar. 9, 2021

(54) APPARATUS FOR RADIO-FREQUENCY RECEIVER WITH IN-PHASE/QUADRATURE CALIBRATION AND ASSOCIATED METHODS

(71) Applicant: Silicon Laboratories Inc., Austin, TX (US)

(72) Inventors: Hendricus de Ruijter, Austin, TX (US); Euisoo Yoo, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 15/870,748

(22) Filed: Jan. 12, 2018

(65) Prior Publication Data

US 2019/0222463 A1    Jul. 18, 2019

(51) Int. Cl.
| | | |
|---|---|---|
| H04L 27/36 | (2006.01) |
| H04B 1/403 | (2015.01) |
| H04B 1/10 | (2006.01) |
| H04L 27/38 | (2006.01) |
| H04B 1/30 | (2006.01) |

(52) U.S. Cl.
CPC ......... *H04L 27/364* (2013.01); *H04B 1/1018* (2013.01); *H04B 1/30* (2013.01); *H04B 1/406* (2013.01); *H04L 27/3863* (2013.01)

(58) Field of Classification Search
CPC . H04L 27/364; H04L 27/3863; H04B 1/1018; H04B 1/30; H04B 1/406
USPC .......................................................... 375/298
See application file for complete search history.

(56) References Cited

U.S. PATENT DOCUMENTS

| | | | | |
|---|---|---|---|---|
| 7,439,897 | B1 * | 10/2008 | Gorin ................... | H03M 1/0629 341/123 |
| 7,459,897 | B2 * | 12/2008 | Awaji ............... | G01R 31/31924 324/713 |
| 8,280,340 | B2 | 10/2012 | Xuan | |
| 2005/0069056 | A1 * | 3/2005 | Willingham ........... | H04B 17/21 375/327 |
| 2006/0111071 | A1 * | 5/2006 | Paulus ................... | H04B 17/21 455/302 |
| 2010/0291891 | A1 * | 11/2010 | Ridgers .................... | H04B 1/30 455/205 |
| 2015/0024699 | A1 * | 1/2015 | Muhammad .............. | H03F 1/34 455/114.3 |

OTHER PUBLICATIONS

Frank Henkel et al., *A 1-MHz-Bandwidth Second-Order Continuous-Time Quadrature Bandpass Sigma-Delta Modulator for Low-IF Radio Receivers*, IEEE J. of Solid-State Circuits, vol. 37, No. 12, Dec. 2002, pp. 1628-1635.

* cited by examiner

*Primary Examiner* — Wednel Cadeau
(74) *Attorney, Agent, or Firm* — Law Offices of Maximilian R. Peterson (57) ABSTRACT

An apparatus includes a radio-frequency (RF) receiver. The RF receiver includes an analog-to-digital converter (ADC) to convert an analog input signal to a digital output signal in response to an ADC clock signal. The RF receiver further includes a frequency generator to selectively provide either a clock signal to be provided as the ADC clock signal or a signal to be used for in-phase-quadrature (IQ) calibration of the RF receiver.

20 Claims, 10 Drawing Sheets

Fig. 1

PRIOR ART

Fig. 2

PRIOR ART

Fig. 3

PRIOR ART

APPARATUS FOR RADIO-FREQUENCY RECEIVER WITH IN-PHASE/QUADRATURE CALIBRATION AND ASSOCIATED METHODS

TECHNICAL FIELD

The disclosure relates generally to communication apparatus and associated methods. More particularly, the disclosure relates to apparatus for radio-frequency (RF) receivers with in-phase/quadrature (I/Q) calibration, and associated methods.

BACKGROUND

With the increasing proliferation of wireless technology, such as Wi-Fi, Bluetooth, and mobile or wireless Internet of things (IoT) devices, more devices or systems incorporate RF circuitry, such as receivers and/or transmitters. To reduce the cost, size, and bill of materials, and to increase the reliability of such devices or systems, various circuits or functions have been integrated into integrated circuits (ICs). For example, ICs typically include receiver and/or transmitter circuitry.

Some wireless communication standards define a preamble for a wireless packet, which is a predefined data pattern that a receiver can use to detect and settle its control loops. The control loops may include the Automatic Gain Control (AGC), Automatic Frequency Compensation (AFC), and Bit Clock Recovery (BCR). After the receiver detects the end of the preamble, the receiver is prepared to receive a full packet including payload data. Some receivers use a preamble detector to detect the arrival of a frame. In response to the preamble detector signaling the detection of the preamble, the receiver begins looking for the next portion of the frame.

The description in this section and any corresponding figure(s) are included as background information materials. The materials in this section should not be considered as an admission that such materials constitute prior art to the present patent application.

SUMMARY

A variety of apparatus and associated methods are contemplated according to exemplary embodiments. According to one exemplary embodiment, an apparatus includes an RF receiver. The RF receiver includes an analog-to-digital converter (ADC) to convert an analog input signal to a digital output signal in response to an ADC clock signal. The RF receiver further includes a frequency generator to selectively provide either a clock signal to be provided as the ADC clock signal or a signal to be used for in-phase-quadrature (IQ) calibration of the RF receiver.

According to another exemplary embodiment, an apparatus includes an RF receiver. The RF receiver has a receive mode of operation and an IQ calibration mode of operation. The RF receiver includes an ADC to convert an analog input signal to a digital output signal, and a single phase locked loop (PLL) to provide either a clock signal to clock the ADC in the receive mode of operation or a signal to be used for in-phase-quadrature (IQ) calibration mode of operation.

According to another exemplary embodiment, a method of operating a radio-frequency (RF) receiver includes using a frequency generator to selectively provide either a clock signal for an ADC to convert an analog input signal to a digital output signal, or a signal to be used for IQ calibration of the RF receiver.

BRIEF DESCRIPTION OF THE DRAWINGS

The appended drawings illustrate only exemplary embodiments and therefore should not be considered as limiting the scope of the application or the claims. Persons of ordinary skill in the art will appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to communication apparatus, such as RF receivers (or transceivers) and associated methods. More particularly, the disclosure relates to apparatus and associated methods for RF receivers with in-phase/quadrature (I/Q, or IQ) calibration.

Modern RF receivers typically use front-end RF circuitry to convert a received RF signal into a digital signal. To do so, analog-to-digital converters (ADCs) are used. A variety of ADCs are commonly used, including delta sigma ADCs.

Second order delta sigma ADC may have advantages in relatively low power consumption receiver designs because of their relatively low power consumption and inherent stable operation over a relatively wide range of input amplitudes. Compared to higher-order sigma delta ADCs, however, second order ADCs use relatively high frequency clock signals.

In some cases, a second order sigma delta ADC uses a clock frequency higher than the frequency of an oscillator used in the RF receiver, such as a crystal oscillator. The crystal oscillator's output signal is commonly used as a reference frequency to generate a local oscillator (LO) signal. The LO signal, as persons of ordinary skill in the art understand, is used for operations such as mixing a received RF signal to generate an intermediate frequency (IF) or baseband signal.

Figure 1:
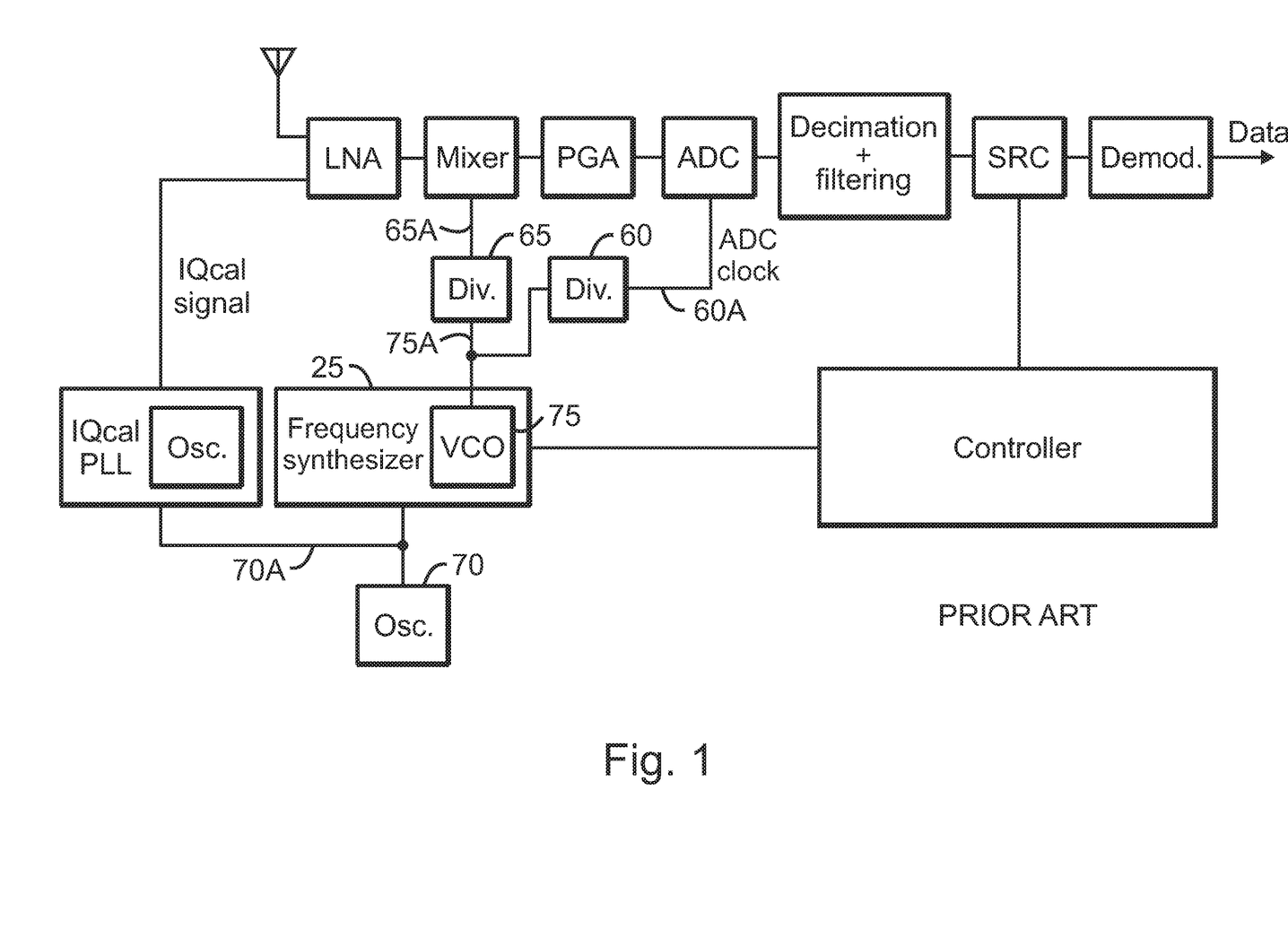
FIG. 1 shows a conventional RF receiver.
Figure 2:
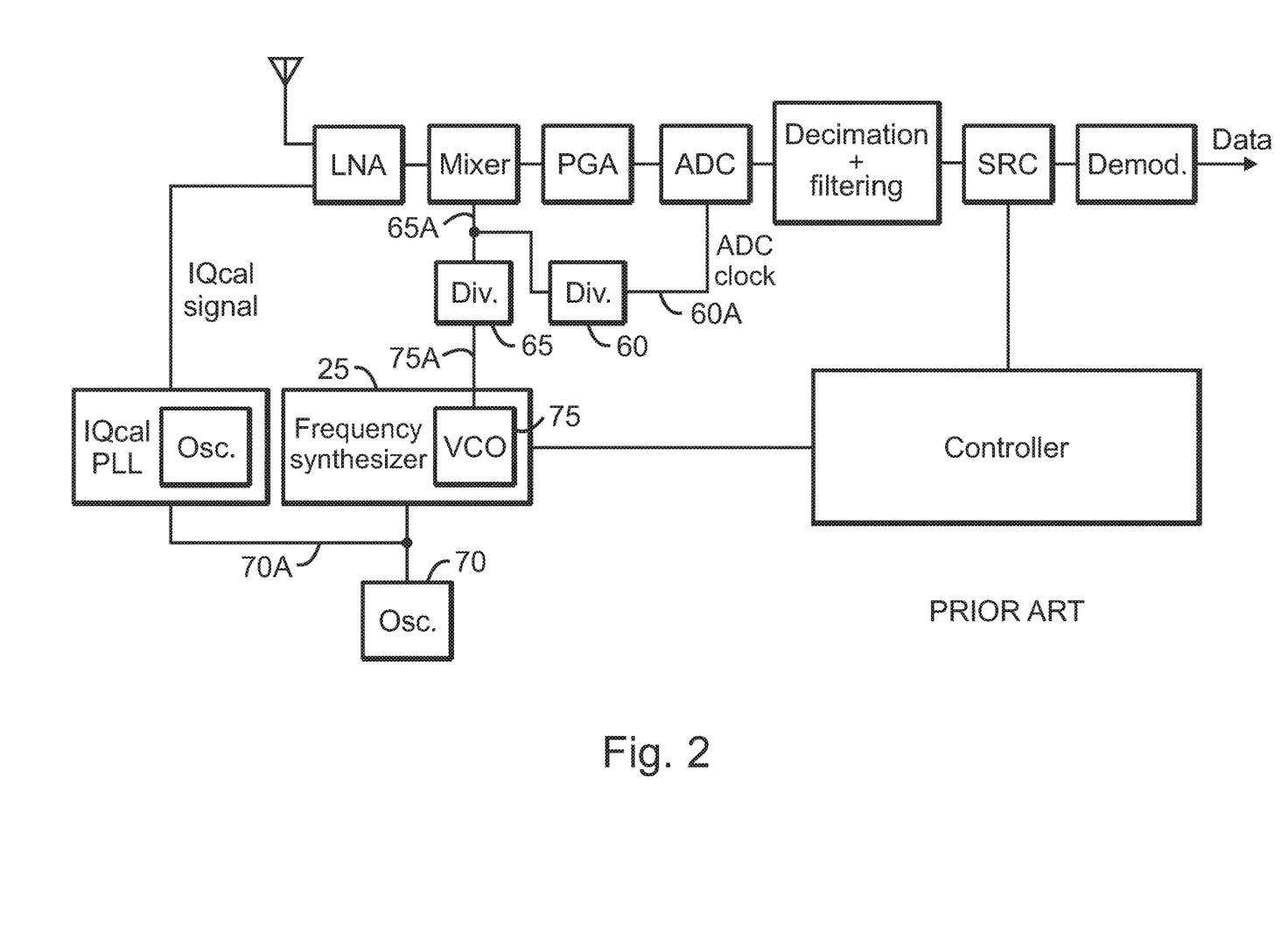
FIG. 2 shows another conventional RF receiver.
Figure 3:
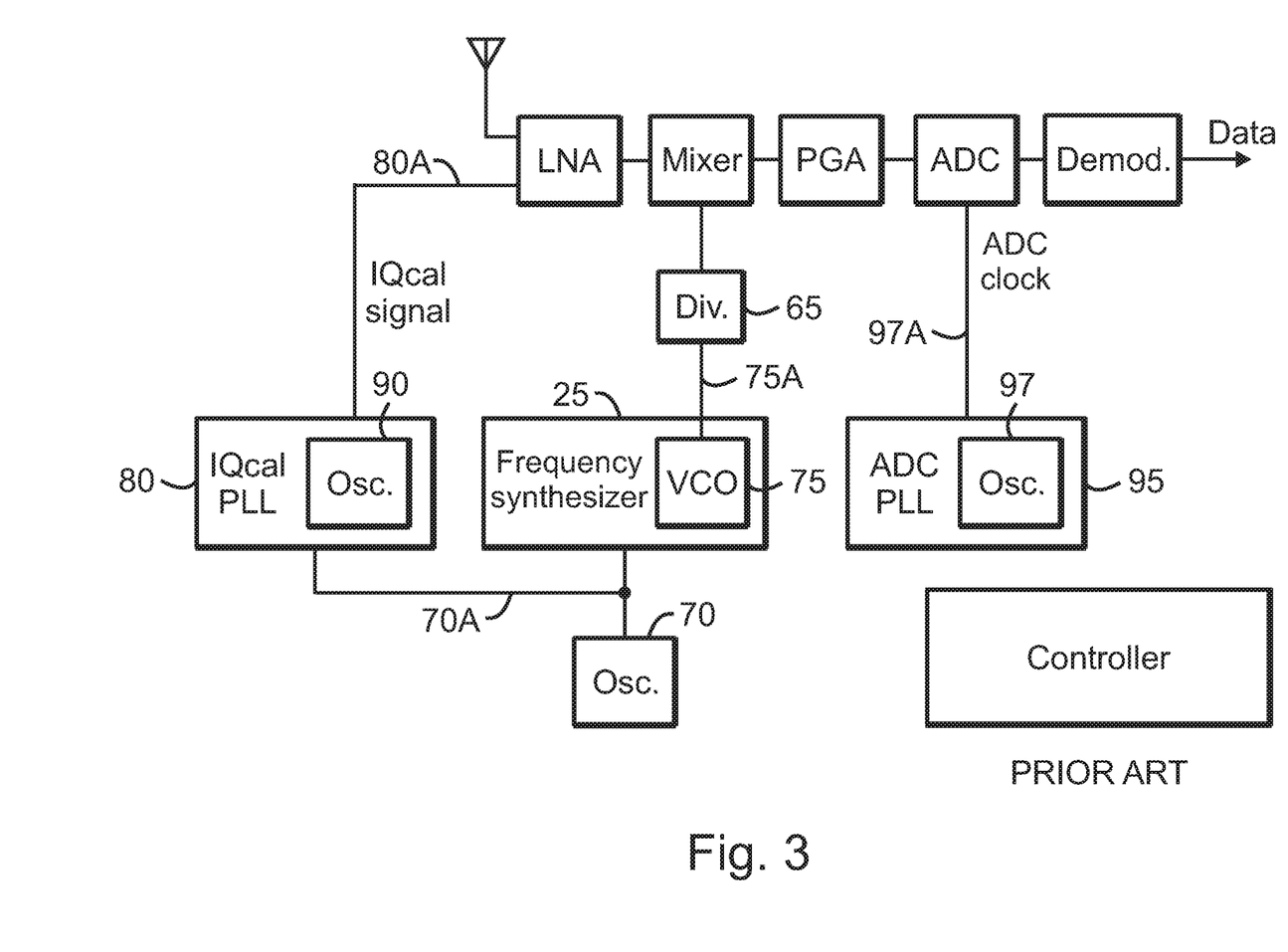
FIG. 3 shows another conventional RF receiver.

Several techniques have been used to generate ADC clock signals. FIGS. 1-3 briefly present conventional techniques for generating ADC clock signals.

FIG. 1 shows a conventional RF receiver that includes an ADC. The ADC clock signal is derived from the LO signal, which is generated by frequency synthesizer 25. More specifically, oscillator 70 provides an output signal 70A to frequency synthesizer 25 which, using voltage controlled oscillator 75, provides an output signal 75A.

Divider 60 is used to divide down the frequency of output signal 75A. The resulting signal, signal 60A, is provided to the ADC as a clock signal. A divider 65 is used to divide the frequency of signal 75A to generate signal 65A. Signal 65A is used in the mixer for the mixing operation described above.

As a result of deriving the ADC clock signal from the LO signal, the sample rate at the ADC output becomes a function of the tuning frequency, i.e., the frequency to which the RF receiver is tuned, as the LO signal is typically related to the tuning frequency.

Thus, a change in the tuning frequency will result in a change in sample rate of the ADC. This change will result in a change in the oversampling ratio. The oversampling ratio is proportional to the ADC clock frequency divided by the symbol frequency. The symbol frequency is determined by the modulation protocol of the received signal, e.g., 1 or 2 Mbps for BLE uncoded PHY. In a typical implementation, the demodulator performs best at certain oversampling ratios, e.g., an integer oversampling ratio. So, a change in the tuning frequency will change the oversampling ratio, and may deteriorate the demodulator's performance. To correct the oversampling ratio, a sample rate converter (SRC) is used, to adjust the sampling rate before the signal enters the demodulator.

This scheme may not operate optimally in situations where the RF receiver uses frequency hopping, such as in one type of spread spectrum communication systems. The frequency hopping scheme would entail constant readjustment of the SRC at every frequency hop. The SRC's readjustment values could be calculated every hop, but doing so might affect the turnaround time, and may add to the energy consumption of the receiver. When the RF channel frequencies are known up-front, all values for SRCs readjustment can be stored in memory, but doing so adds to the memory footprint and, hence, to the cost of the receiver. For proprietary schemes, users need to find their own appropriate values to program into the SRC to support their proprietary RF frequencies. Doing so complicates product development, and extend development efforts in both cost and time.

Furthermore, in RF receivers that use automatic frequency compensation (AFC), the ADC's sample rate is shifted during the operation of the receiver. This scenario might lead to meta-stability or glitches in the digital logic in the RF receiver (e.g., in the demodulator) because of the change in the clock timing during operation of the receiver. Moreover, the development time of a receiver, as shown in FIG. 1, is effected because LO frequency changes entail verification and validation.

In an alternative scheme, divider 60 uses output signal 65A of divider 65 as an input signal (to divide), rather than signal 75A. FIG. 2 shows another conventional RF receiver that uses this alternative scheme. Nevertheless, the receiver in FIG. 2 has the same or similar characteristics as does the receiver in FIG. 1.

An alternative type of RF receiver uses a phase locked loop (PLL) that derives the ADC clock signal from the output signal of the crystal oscillator. FIG. 3 shows another conventional RF receiver that uses this scheme.

More specifically, the phase locked loop (PLL) allows for an ADC clock frequency that is higher than the crystal oscillation frequency. In FIG. 3, ADC PLL 95 is used to perform this function by using oscillator 97.

A similar PLL, IQcal PLL 80, may be used to provide an RF signal as an input signal to the receiver to perform an IQ calibration. In this type of RF receiver, the ADC clock rate is independent of the tuning frequency of the receiver. An extra PLL, however, is used to generate the ADC clock signal. Thus, such a receiver may have three PLLs: one PLL to derive the LO signal (e.g., used in frequency synthesizer 75), a second PLL 80 to generate the IQ calibration signal, and a third PLL 95 to generate the ADC clock signal. Using three PLLs adds to the IC's area and cost.

Figure 4:
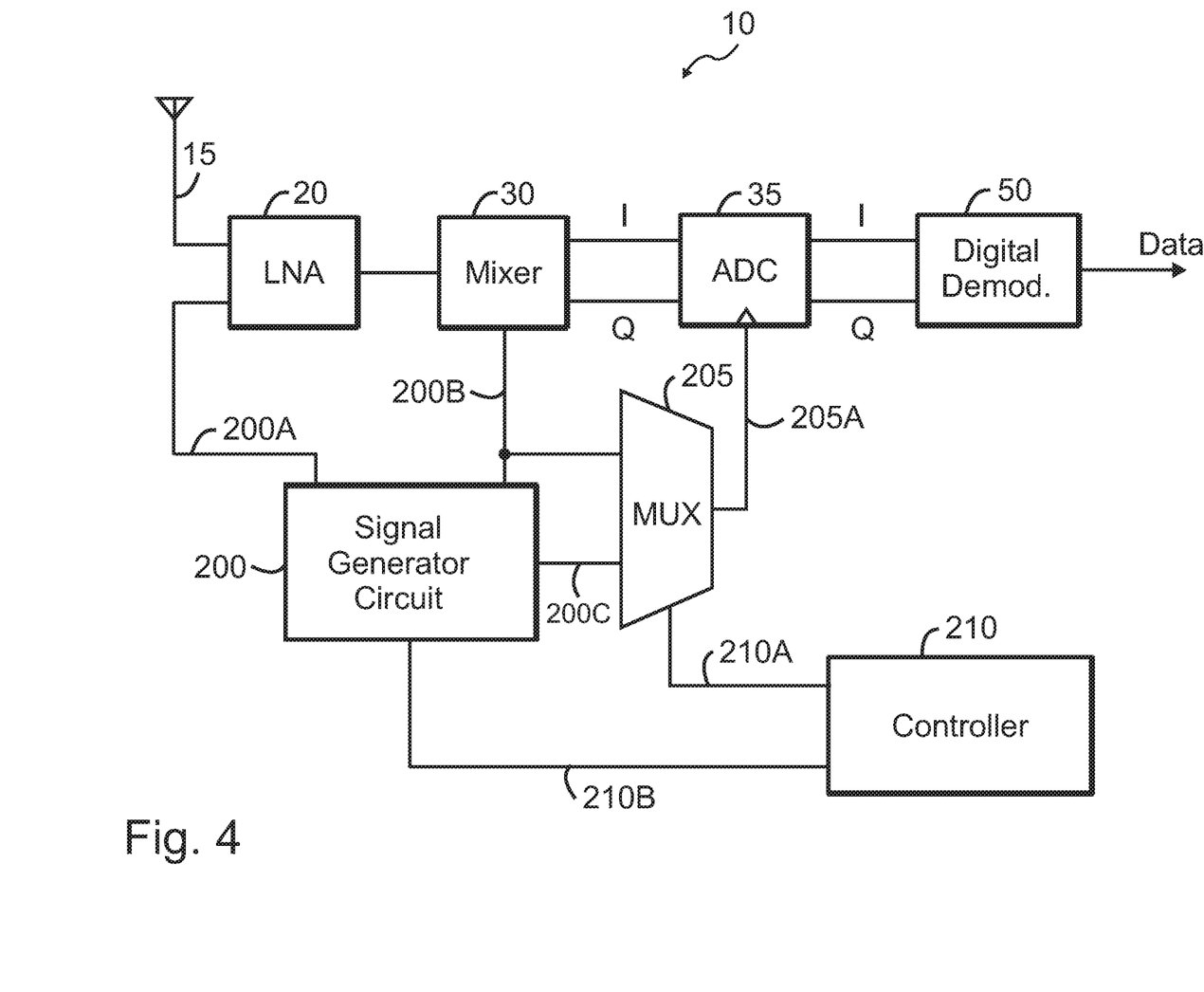
FIG. 4 shows an RF receiver according to an exemplary embodiment.

In exemplary embodiments, a signal generator circuit is used to generate both the IQ calibration signal and the ADC clock signal. FIG. 4 shows an RF receiver 10, including receive-path circuitry, according to an exemplary embodiment that uses this scheme. The receive-path circuitry includes various components or blocks shown in the figure.

Receiver 10 uses antenna 15 to receive RF signals. The received RF signals are provided to an input of low noise amplifier (LNA) 20. LNA 20 provides low-noise amplification of the RF signals, and provides amplified RF signals to mixer 30.

Mixer 30 performs frequency translation or shifting of the RF signals, using a reference or local oscillator (LO) signal 200B provided by signal generator circuit 200. For example, in some embodiments, mixer 30 translates the RF signal frequencies to baseband frequencies. As another example, in some embodiments, mixer 30 translates the RF signal frequencies to an intermediate frequency (IF).

Mixer 30 provides the translated output signal as a set of two signals, an in-phase (I) signal, and a quadrature (Q) signal. The I and Q signals are analog time-domain signals. Analog to digital converter (ADC) 35 performs the signal conversion, i.e., converting the I and Q signals to digital I and Q signals. In exemplary embodiments, ADC 35 may use a variety of signal conversion techniques. For example, in some embodiments, ADC 35 may use delta-sigma (or sometimes called sigma-delta) analog to digital conversion.

To perform signal conversion, ADC 35 uses clock signal (or ADC clock signal 205A. As described in detail below, signal 205A constitutes a signal selected from a pair of other signals, i.e., LO signal 200B and a signal 200C provided by signal generator circuit 200. Note that other arrangements for providing the ADC clock signal are possible and are contemplated. For example, in some embodiments, similar to the circuits shown in FIGS. 1-3, a divider (not shown in FIG. 4) may be used to divide the frequency of LO signal 200B to generate a signal with a lower frequency that is provided to MUX 205.

Referring again to FIG. 4, ADC 35 provides the digital I and Q signals to digital demodulator 50. Generally speaking, digital demodulator 50 performs processing on the digital I and Q signals, for example, digital signal processing (DSP). In exemplary embodiments, digital demodulator 50 demodulates the signal received from ADC 35.

In various embodiments, such as the exemplary embodiment in FIG. 4, a single PLL is used to perform two tasks, as described below in detail. More specifically, a single PLL (included in signal generator circuit 200) is used for both IQ calibration and for providing signal 200C to multiplexer (MUX) 205. Another input of MUX 205 is LO signal 200B.

A controller 210 provides a select signal 210A to MUX 205. Based on the value of the select signal, MUX 205 provides either signal 200C or LO signal 200B as clock signal 205A to ADC 35.

Controller 210 provides signal 210B to signal generator circuit 200. In response to signal 210B (e.g., when signal 210B is asserted), signal generator circuit 200 provides signal 200A to LNA 20. Signal 200A is used to perform IQ calibration. IQ calibration is commonly done using an unmodulated tone on a single frequency, although other schemes may be used, as desired.

When controller 210 uses signal 210B (e.g., by asserting signal 210B) to cause IQ calibration, the PLL (not shown) in signal generator circuit 200 is used to perform IQ calibration. When signal 210B is not used to cause IQ calibration (e.g., signal 210B is de-asserted), signal 210B may be used to generate signal 200C. Signal 200C, as noted above, may be used to provide clock signal 205A to ADC 35, depending on select signal 210A, described above.

As shown in the figure, LNA 20 receives both a signal from antenna 15 and signal 200A from signal generator circuit 200. As noted above, signal 200A is used for IQ calibration. Thus, during normal or receive operation of receiver 10 (i.e., when not performing IQ calibration, as caused by controller 210), LNA 20 uses the signal from antenna 15 to receive and process an RF signal, as described above. Conversely, during IQ calibration (as caused by controller 210), LNA 20 uses signal 200A from signal generator circuit 200 to facilitate IQ calibration.

In exemplary embodiments, LNA 20 may use a variety of techniques to use signals from antenna 15 and from signal generator circuit 200. In some embodiments, a switch may be used to select between the signal from antenna 15 and signal 200A from signal generator circuit 200, as desired.

In other embodiments, an analog MUX or capacitive coupling may be used, as desired. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Figure 5:
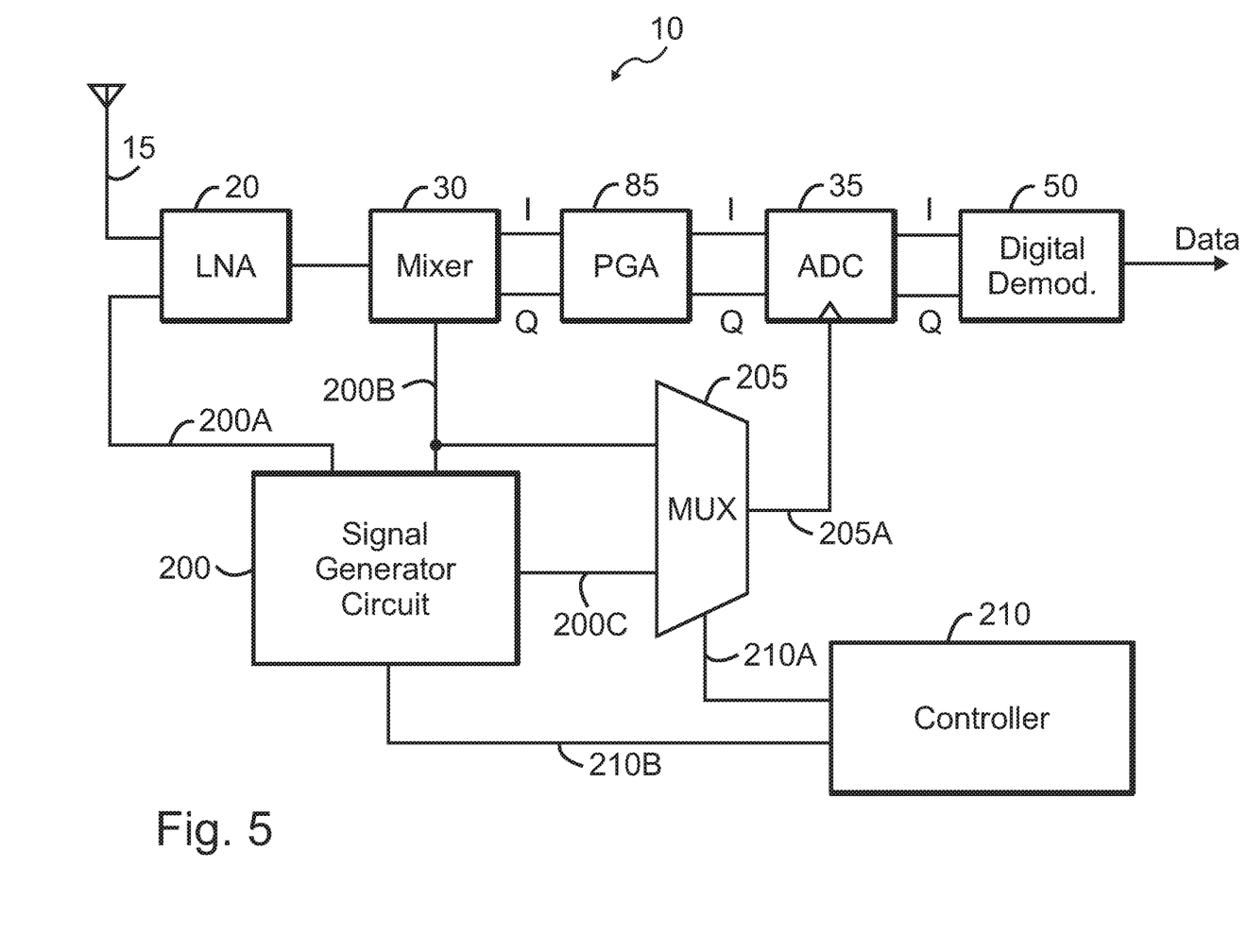
FIG. 5 shows an RF receiver according to another exemplary embodiment.

FIG. 5 shows an RF receiver 10, including receive-path circuitry, according to an exemplary embodiment that uses this scheme. The receive-path circuitry includes various components or blocks shown in the figure. Receiver 10 in FIG. 5 is similar to the circuit arrangement shown in FIG. 4 and operates similarly. Unlike the circuit in FIG. 4, however, receiver 10 in FIG. 5 includes programmable gain amplifier (PGA) 85. PGA 85 provides programmable gain for the filtered signal at the output of filter 80.

In some embodiments, PGA 85 has a gain that is programmable for different input levels of the RF signals received by antenna 15. In some embodiments, PGA 85 has a gain that is programmable for different frequency bands of the RF signals received by antenna 15. In some embodiments, PGA 85 may include more than one stage of amplification, for example, two or more "slices" of amplifier circuitry coupled in a cascade configuration, as desired. The gain of the various stages may be programmed in a similar or independent manner, as desired.

Figure 6:
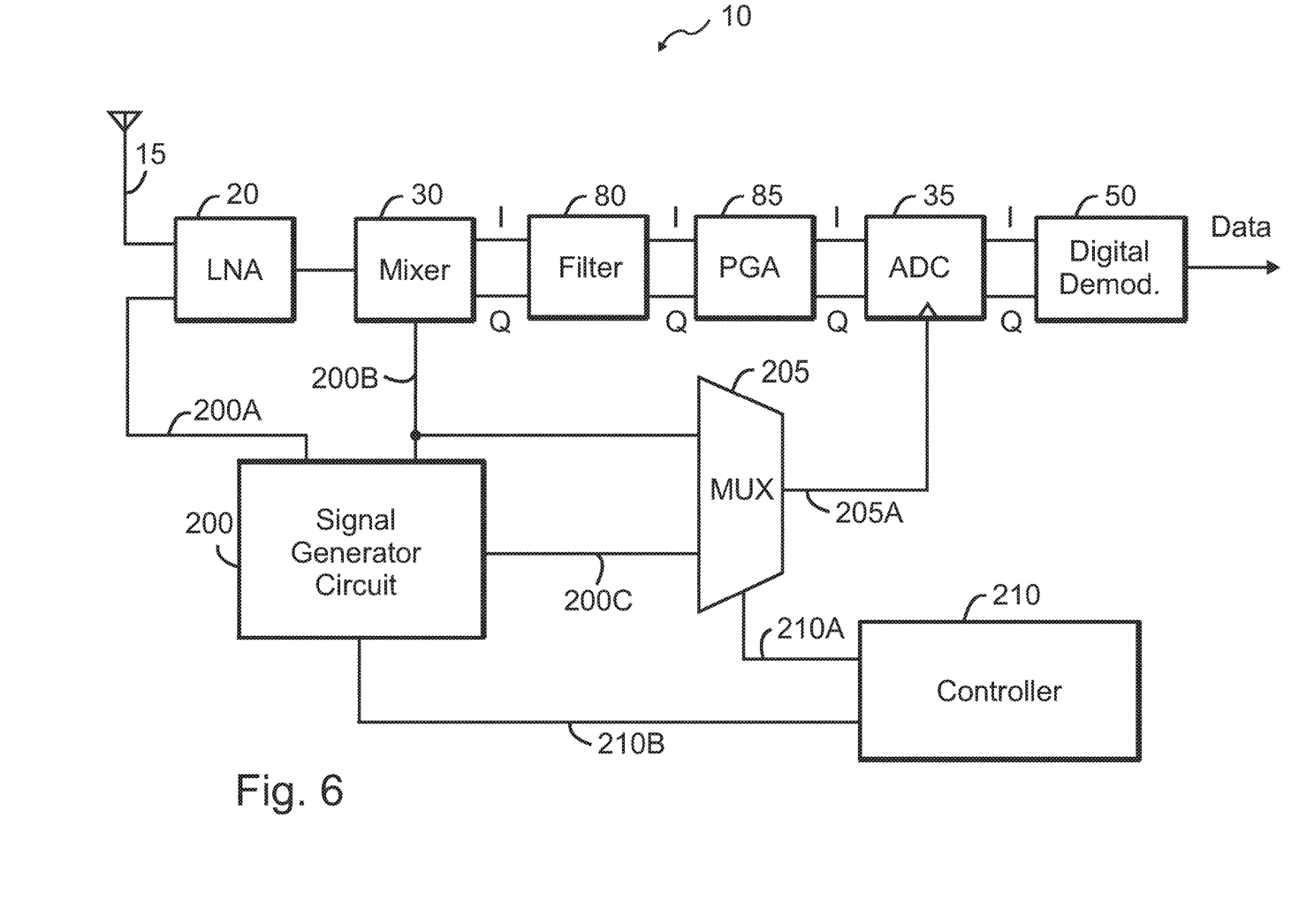
FIG. 6 shows an RF receiver according to another exemplary embodiment.

FIG. 6 shows an RF receiver 10, including receive-path circuitry, according to an exemplary embodiment that uses this scheme. The receive-path circuitry includes various components or blocks shown in the figure. Receiver 10 in FIG. 6 is similar to the circuit arrangements shown in FIGS. 4-5 and operates similarly. Unlike the circuit in FIGS. 4-5, however, receiver 10 in FIG. 6 includes filter 80.

Filter 80 provides filtering of the RF or baseband signal at the output of mixer 30. For example, in some embodiments, filter 80 may perform channel filtering. Filter 80 may perform other filtering functions in other embodiments, as persons of ordinary skill in the art will understand.

Note that variations of receiver 10 are possible and contemplated in exemplary embodiments. For example, in some embodiments, receiver 10 may include filter 80, but not PGA 85. As another example, in some embodiments, receiver 10 may swap the order of PGA 85 and filter 80. Other possibilities exist, for example, including one or more filters between antenna 15 and LNA 20 to facilitate accommodating several RF signal bands, etc. As another example, a circuit arrangement may be used that takes into account I and Q imbalance and image rejection properties of receiver 10. An example architecture is shown in FIG. 3C.1 of Appendix 3C of the book "RF System Design of Transceivers for Wireless Communications" by Qizheng Gu (copyright 2005) (available at http://www.globalspec.com/reference/75755/203279/appendix-3c-i-and-q-imbalance-and-image-rejection-formula).

Figure 7:
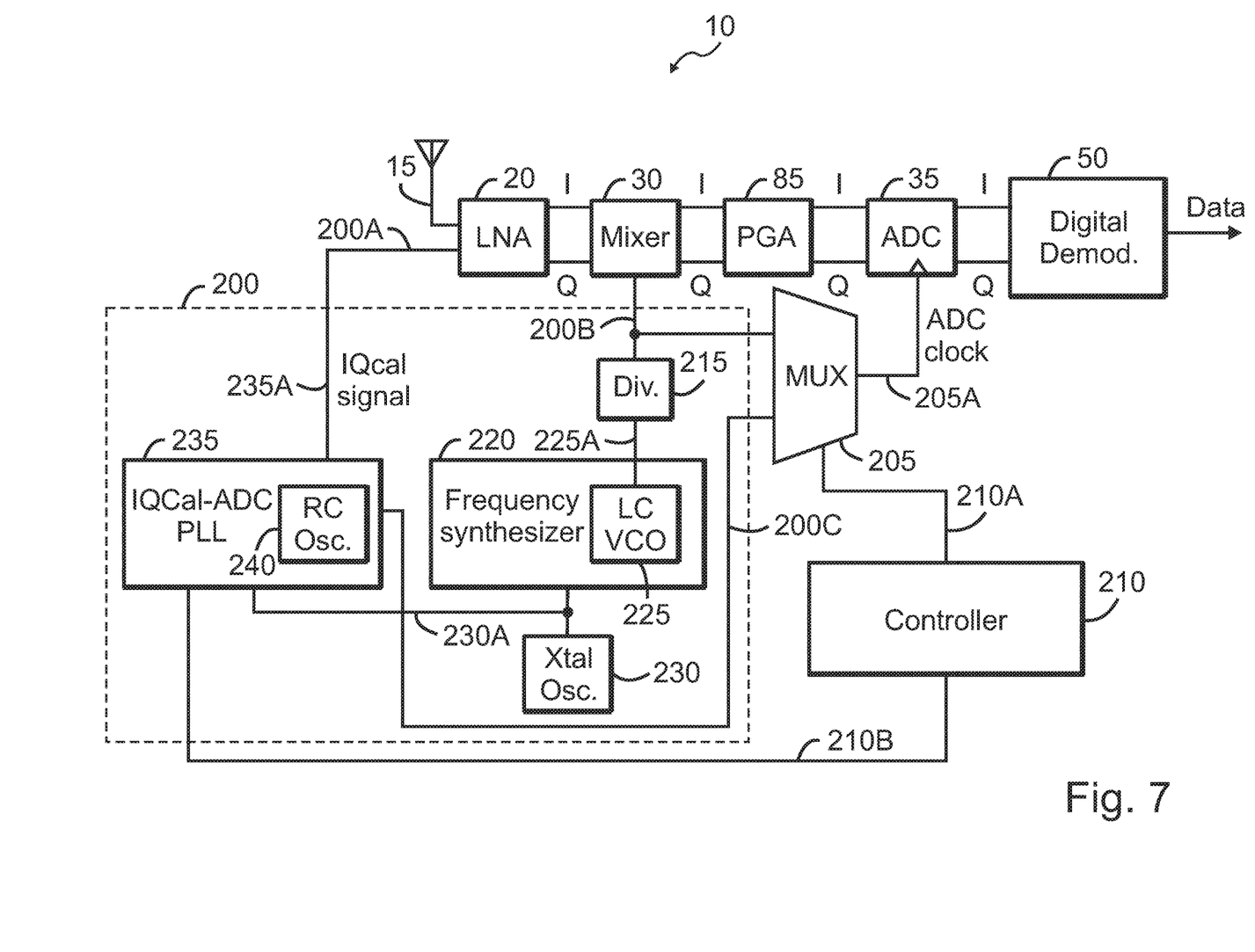
FIG. 7 shows an RF receiver according to another exemplary embodiment.

As noted above, in various embodiments, a single PLL is used to provide both a signal for IQ calibration and an ADC clock signal. FIG. 7 shows an RF receiver 10, including receive-path circuitry, according to an exemplary embodiment that uses this scheme. The receive-path circuitry includes various components or blocks shown in the figure. FIG. 7 provides details of using the PLL.

More specifically, FIG. 7 provides more details of signal generator circuit 200. In the embodiment shown, signal generator circuit 200 includes oscillator 230 (a crystal oscillator in this embodiment, labeled "Xtal Osc."), frequency synthesizer 220, and a frequency generator, which in the embodiment shown is PLL 235. Note that PLL 235 is labeled "IQCal-ADC PLL" to denote its dual functions of selectively (based on signal 210B) providing an IQ calibration signal 200A or clock signal 200C.

Frequency synthesizer 220 includes a voltage controlled oscillator (VCO) 225. In the embodiment shown, VCO 225 is an inductor-capacitor type (LC tank), labeled "LC VCO." VCO 225 is used to generate output signal 225A of frequency synthesizer 220, which is provided to divider 215.

Divider 215 divides down the frequency of output signal 225 to generate LO signal 200B. LO signal 200B is provided to mixer 30, as described above. The division ratio used by divider 215 depends on the relatively frequencies of output signal 225A and the desired frequency of LO signal 200B, as persons of ordinary skill in the art will understand.

Note that in some embodiments, divider 215 may be omitted. Specifically, if the frequency of output signal 225A has a value that is suitable for its use as LO signal 200B, then divider 215 may be omitted, and output signal 225A may be used as the LO signal (i.e., provided to mixer 30).

As noted above, PLL 235 (labeled "IQCal-ADC PLL" to denote its dual functions) operates in response to control signal 210B. Through signal 210B, controller 210 can cause PLL 235 to generate either signal 235A, which is used for IQ calibration as signal 200A of signal generator circuit 200, as described above, or signal 200C, which is used by MUX 205 to selectively provide to ADC 35 as a clock signal. In operational mode, receiver 10 uses signal 200C to clock ADC 35. By doing so, ADC 35, and hence digital demodulator 50, can operate on a clock frequency that is independent from the LO frequency, as carried by signal 200B. To accomplish this operational mode, controller 210 can select signal 200C in MUX 205, using control signal 210A, to provide signal 200C as clock signal 205A to ADC 35. Clock signal 205A can also be used in the digital demodulator 50, as desired. In addition, controller 210 can enable signal 200C and disable signal 235A using control signal 210B. In IQ calibration mode, controller 210 can enable IQcal signal 235A and disable signal 200C by using control signal 210B.

Also, in IQ calibration mode, controller 210 can select signal 200B, through MUX 205, as clock signal 205A for ADC 35, using control signal 210A. Using signal 200B as clock signal for ADC 35 is much less problematic than in operational mode, given that in a typical application, the IQ is calibrated without needing to demodulate the signal. In a typical IQ calibration, the IQcal signal 235A is not modulated. Thus, there is no need to readjust the SRC when the calibration frequency, as carried by IQcal signal 235A, is changed.

Note that PLL 235 uses a resistor-capacitor (RC) oscillator 240 to generate one or more signals. In other embodiments, other types of oscillator may be used, as persons of ordinary skill in the art will understand. The choice of circuitry for a given implementation of oscillator 240 depends on a variety of factors, as persons of ordinary skill in the art will understand. Such factors include design specifications, performance specifications, cost, IC or device area, available technology, such as semiconductor fabrication technology), target markets, target end-users, etc.

Signal 200B and signal 200C from signal generator circuit 200 are provided as input signals to MUX 205. As described above, in response to select signal 210A from controller 210, MUX 205 provides either signal 200B or signal 200C to ADC 35 as a clock signal.

As noted above, a single PLL, PLL 235, is used for both IQ calibration signal and for providing an ADC clock signal. More specifically, during normal or receive or regular operation of receiver 10 (i.e., receiving RF signals provided by antenna 15, not performing IQ calibration), PLL 235 generates clock signal 200C for ADC 35. Controller 210 uses select signal 210A to cause MUX 205 to provide signal 200C as a clock signal to ADC 35. In exemplary embodiments, PLL 235 may also be implemented as a frequency lock loop (FLL), an all digital PLL, or any other frequency synthesis technique or circuit arrangement, as persons of ordinary skill in the art will understand.

Note that during normal or receive operation of receiver 10, IQ calibration is not used. Thus, PLL 235, which would otherwise be unused, is used to provide signal 200C, which is provided to ADC 35 for the purpose of clocking the ADC.

Conversely, during IQ calibration, controller 210 uses select signal 210A to cause MUX 205 to provide signal 200B to ADC 35 as the ADC clock signal. Signal 200B, as described above, is derived from output signal 225A of frequency synthesizer 220, i.e., signal 200B is a frequency-divided version of output signal 225A.

By virtue of using signal 200B to clock ADC 35 during the IQ calibration mode, PLL 235 becomes available for use in IQ calibration. In other words, during the IQ calibration mode, PLL 235 is used to generate the IQ calibration signal.

By virtue of using this scheme, LO signal 200B has a relatively stable frequency and, hence, the ADC clock signal is free (or nearly free in a practical, physical implementation) from frequency and phase changes during the entire IQ calibration. The clock timing at the output of ADC 35 (going into digital demodulator 50) is relatively constant and free (or nearly free in a practical, physical implementation) from frequency and phase changes, which avoids the risks of meta-stability and glitches mentioned above. Furthermore, by reusing PLL 235, the area of an IC that includes receiver 10 is reduced, by virtue of using a single PLL to perform two functions.

Figure 8:
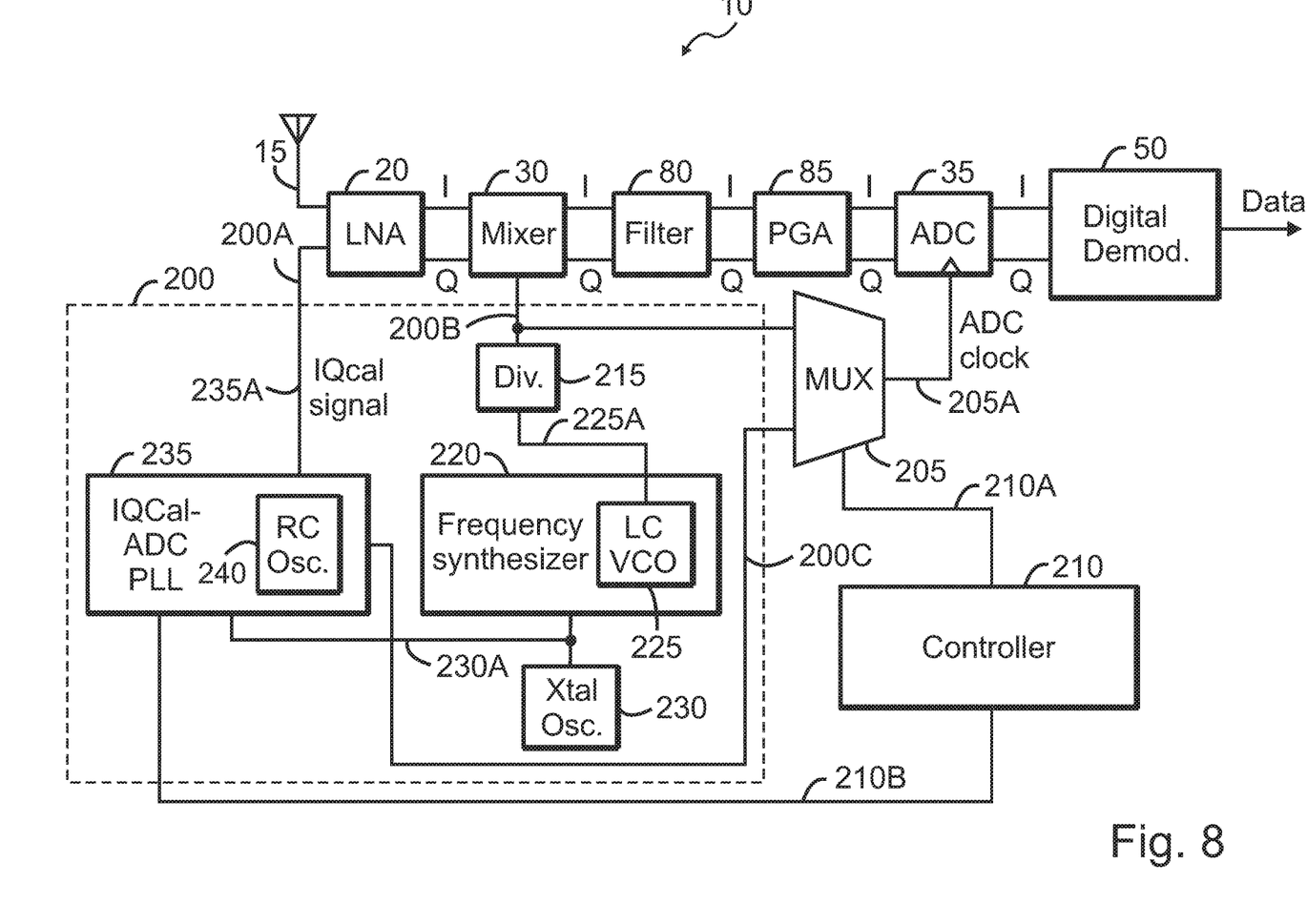
FIG. 8 shows an RF receiver according to another exemplary embodiment.

FIG. 8 shows an RF receiver 10, including receive-path circuitry, according to an exemplary embodiment that uses this scheme. The receive-path circuitry includes various components or blocks shown in the figure. Receiver 10 in FIG. 8 is similar to the circuit arrangements shown in FIG. 7 and operates similarly. Unlike the circuit in FIG. 7, however, receiver 10 in FIG. 8 includes filter 80.

As noted above, filter 80 provides filtering of the RF or baseband signal at the output of mixer 30. For example, in some embodiments, filter 80 may perform channel filtering. Filter 80 may perform other filtering functions in other embodiments, as persons of ordinary skill in the art will understand.

Note that variations of receiver 10 are possible and contemplated in exemplary embodiments. For example, in some embodiments, receiver 10 may include filter 80, but not PGA 85. As another example, in some embodiments, receiver 10 may swap the order of PGA 85 and filter 80. Other possibilities exist, for example, including one or more filters between antenna 15 and LNA 20 to facilitate accommodating several RF signal bands, etc., as noted above.

Figure 9:
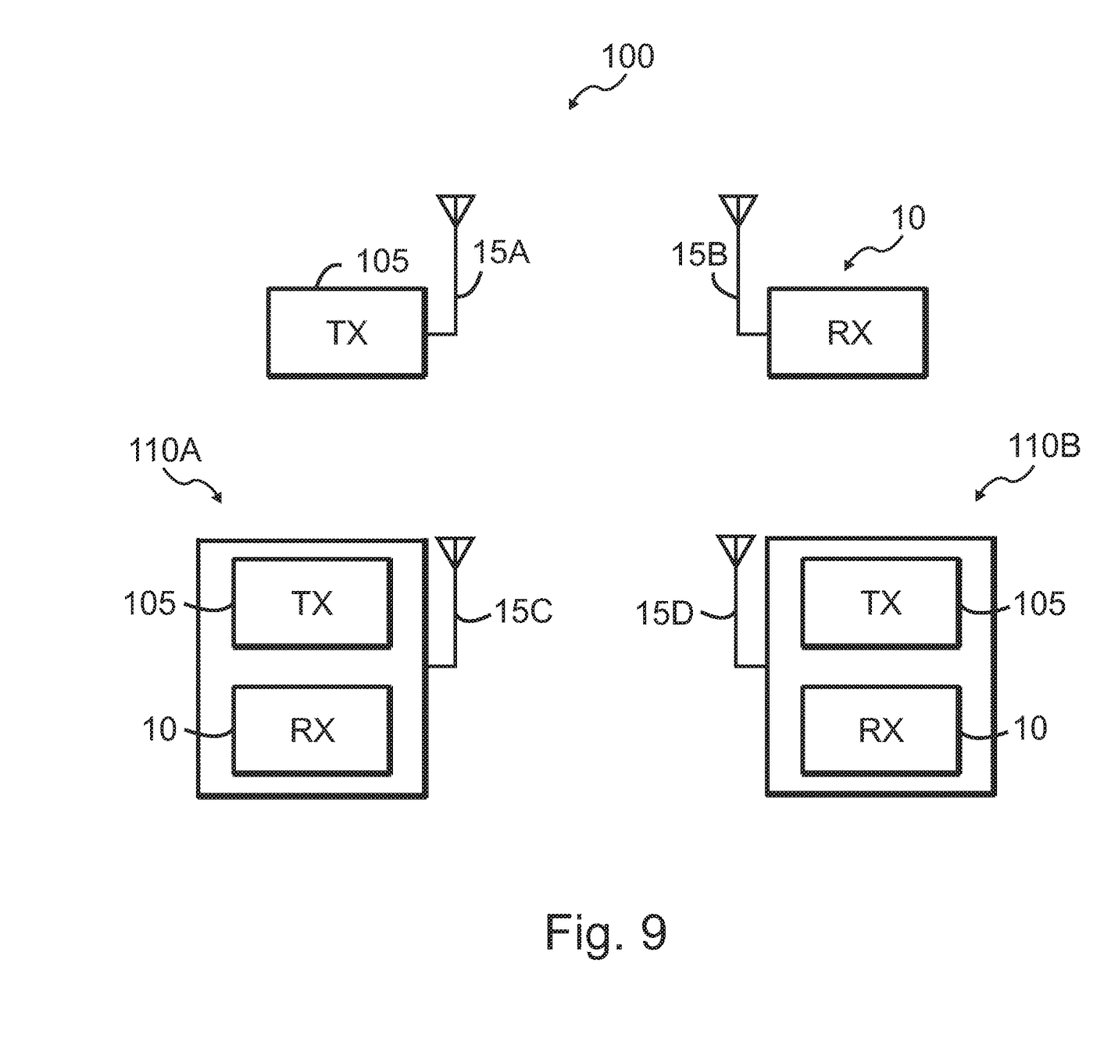
FIG. 9 shows a system for radio communication according to an exemplary embodiment.

Receivers according to exemplary embodiments may be used in a variety of communication arrangements, systems, sub-systems, networks, etc., as desired. FIG. 9 shows a system 100 for radio communication according to an exemplary embodiment.

System 100 includes a transmitter 105, coupled to antenna 15A. Via antenna 15A, transmitter 105 transmits RF signals. The RF signals may be received by receiver 10, described above. In addition, or alternatively, transceiver 110A and/or transceiver 110B might receive (via receiver 10) the transmitted RF signals.

In addition to receive capability, transceiver 110A and transceiver 110B can also transmit RF signals. The transmitted RF signals might be received by receiver 10, either in the stand-alone receiver, or via the receiver circuitry of the non-transmitting transceiver.

Other systems or sub-systems with varying configuration and/or capabilities are also contemplated. For example, in some exemplary embodiments, two or more transceivers (e.g., transceiver 110A and transceiver 110B) might form a network, such as an ad-hoc network. As another example, in some exemplary embodiments, transceiver 110A and transceiver 110B might form part of a network, for example, in conjunction with transmitter 105.

Figure 10:
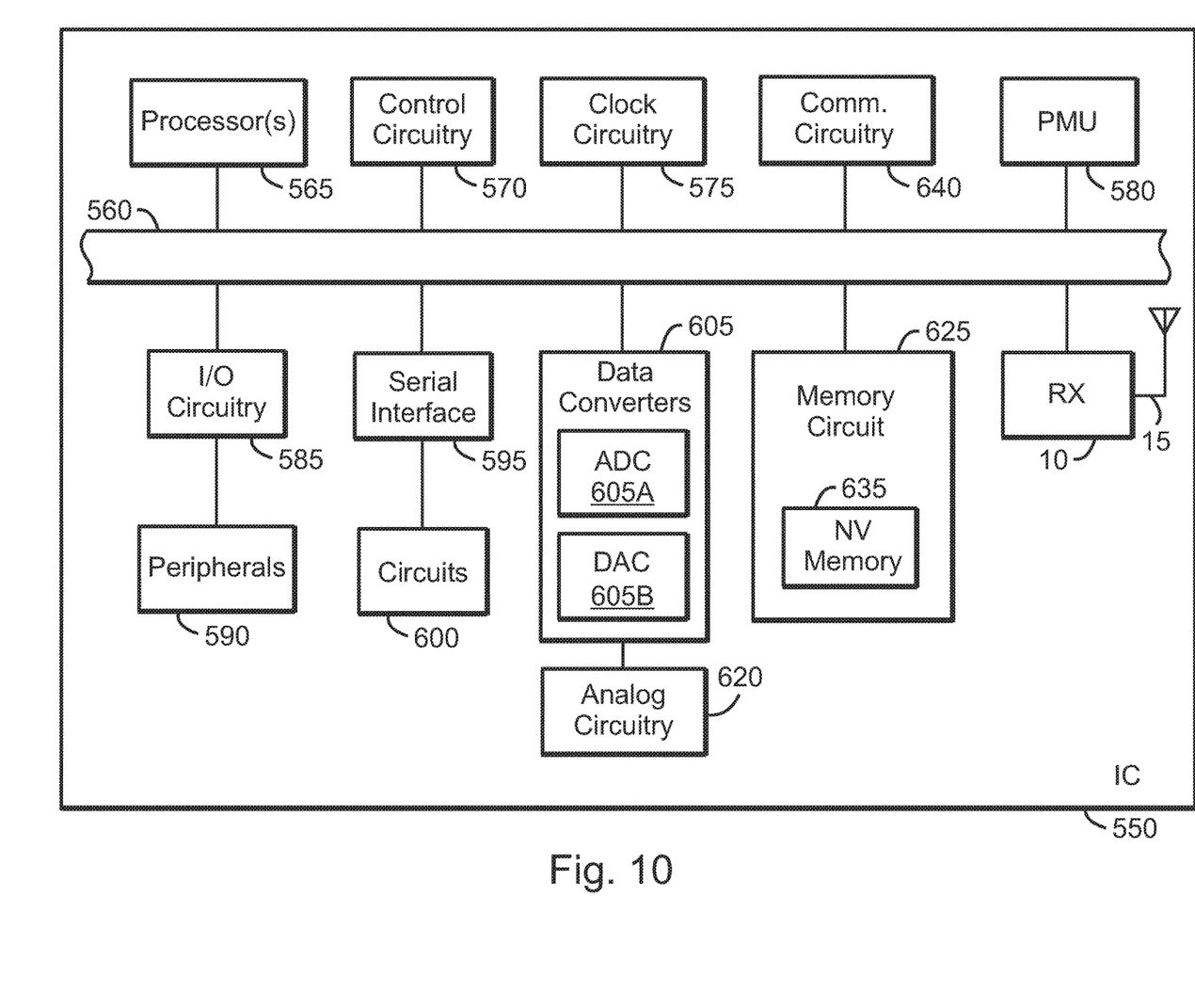
FIG. 10 shows a block diagram of an IC according to an exemplary embodiment.

RF receivers, such as RF receiver 10 described above, may be used in a variety of circuits, blocks, subsystems, and/or systems. For example, in some embodiments, such RF receivers may be integrated in an IC, such as an MCU. FIG. 10 shows a block diagram of an IC 550 according to an exemplary embodiment.

The circuit arrangement includes an IC 550, which constitutes or includes an MCU. IC 550 includes a number of blocks (e.g., processor(s) 565, data converter 605, I/O circuitry 585, etc.) that communicate with one another using a link 560. In exemplary embodiments, link 560 may constitute a coupling mechanism, such as a bus, a set of conductors or semiconductor elements (e.g., traces, devices, etc.) for communicating information, such as data, commands, status information, and the like.

IC 550 may include link 560 coupled to one or more processors 565, clock circuitry 575, and power management circuitry or power management unit (PMU) 580. In some embodiments, processor(s) 565 may include circuitry or blocks for providing information processing (or data processing or computing) functions, such as central-processing units (CPUs), arithmetic-logic units (ALUs), and the like. In some embodiments, in addition, or as an alternative, processor(s) 565 may include one or more DSPs. The DSPs may provide a variety of signal processing functions, such as arithmetic functions, filtering, delay blocks, and the like, as desired. In some embodiments, functionality of parts of receiver 10, such as those described above, may be implemented or realized using some of the circuitry in processor(s) 565, as desired Referring again to FIG. 10, clock circuitry 575 may generate one or more clock signals that facilitate or control the timing of operations of one or more blocks in IC 550. Clock circuitry 575 may also control the timing of operations that use link 560, as desired. In some embodiments, clock circuitry 575 may provide one or more clock signals via link 560 to other blocks in IC 550.

In some embodiments, PMU 580 may reduce an apparatus's (e.g., IC 550) clock speed, turn off the clock, reduce power, turn off power, disable (or power down or place in a lower power consumption or sleep or inactive or idle state), enable (or power up or place in a higher power consumption or normal or active state) or any combination of the foregoing with respect to part of a circuit or all components of a circuit, such as one or more blocks in IC 550. Further, PMU 580 may turn on a clock, increase a clock rate, turn on power, increase power, or any combination of the foregoing in response to a transition from an inactive state to an active state (including, without limitation, when processor(s) 565 make a transition from a low-power or idle or sleep state to a normal operating state).

Link 560 may couple to one or more circuits 600 through serial interface 595. Through serial interface 595, one or more circuits or blocks coupled to link 560 may communicate with circuits 600. Circuits 600 may communicate using one or more serial protocols, e.g., SMBUS, I$^2$C, SPI, and the like, as person of ordinary skill in the art will understand.

Link 560 may couple to one or more peripherals 590 through I/O circuitry 585. Through I/O circuitry 585, one or more peripherals 590 may couple to link 560 and may therefore communicate with one or more blocks coupled to link 560, e.g., processor(s) 365, memory circuit 625, etc.

In exemplary embodiments, peripherals 590 may include a variety of circuitry, blocks, and the like. Examples include I/O devices (keypads, keyboards, speakers, display devices, storage devices, timers, sensors, etc.). Note that in some embodiments, some peripherals 590 may be external to IC 550. Examples include keypads, speakers, and the like.

In some embodiments, with respect to some peripherals, I/O circuitry 585 may be bypassed. In such embodiments, some peripherals 590 may couple to and communicate with link 560 without using I/O circuitry 585. In some embodiments, such peripherals may be external to IC 550, as described above.

Link 560 may couple to analog circuitry 620 via data converter(s) 605. Data converter(s) 605 may include one or more ADCs 605A and/or one or more DACs 605B.

ADC(s) 605A receive analog signal(s) from analog circuitry 620, and convert the analog signal(s) to a digital format, which they communicate to one or more blocks coupled to link 560. Conversely, DAC(s) 605B receive digital signal(s) from one or more blocks coupled to link 560, and convert the digital signal(s) to analog format, which they communicate to analog circuitry 620.

Analog circuitry 620 may include a wide variety of circuitry that provides and/or receives analog signals. Examples include sensors, transducers, and the like, as person of ordinary skill in the art will understand. In some embodiments, analog circuitry 620 may communicate with circuitry external to IC 550 to form more complex systems, sub-systems, control blocks or systems, feedback systems, and information processing blocks, as desired.

Control circuitry 570 couples to link 560. Thus, control circuitry 570 may communicate with and/or control the operation of various blocks coupled to link 560 by providing control information or signals. In some embodiments, control circuitry 570 also receives status information or signals from various blocks coupled to link 560. In addition, in some embodiments, control circuitry 570 facilitates (or controls or supervises) communication or cooperation between various blocks coupled to link 560.

In some embodiments, control circuitry 570 may initiate or respond to a reset operation or signal. The reset operation may cause a reset of one or more blocks coupled to link 560, of IC 550, etc., as person of ordinary skill in the art will understand. For example, control circuitry 570 may cause PMU 580, and circuitry such as RF receiver 10, to reset to an initial or known state.

In exemplary embodiments, control circuitry 570 may include a variety of types and blocks of circuitry. In some embodiments, control circuitry 570 may include logic circuitry, finite-state machines (FSMs), or other circuitry to perform operations such as the operations described above.

Communication circuitry 640 couples to link 560 and also to circuitry or blocks (not shown) external to IC 550. Through communication circuitry 640, various blocks coupled to link 560 (or IC 550, generally) can communicate with the external circuitry or blocks (not shown) via one or more communication protocols. Examples of communications include USB, Ethernet, and the like. In exemplary embodiments, other communication protocols may be used, depending on factors such as design or performance specifications for a given application, as person of ordinary skill in the art will understand.

As noted, memory circuit 625 couples to link 560. Consequently, memory circuit 625 may communicate with one or more blocks coupled to link 560, such as processor(s) 365, control circuitry 570, I/O circuitry 585, etc.

Memory circuit 625 provides storage for various information or data in IC 550, such as operands, flags, data, instructions, and the like, as persons of ordinary skill in the art will understand. Memory circuit 625 may support various protocols, such as double data rate (DDR), DDR2, DDR3, DDR4, and the like, as desired.

In some embodiments, memory read and/or write operations by memory circuit 625 involve the use of one or more blocks in IC 550, such as processor(s) 565. A direct memory access (DMA) arrangement (not shown) allows increased performance of memory operations in some situations. More specifically, DMA (not shown) provides a mechanism for performing memory read and write operations directly between the source or destination of the data and memory circuit 625, rather than through blocks such as processor(s) 565.

Memory circuit 625 may include a variety of memory circuits or blocks. In the embodiment shown, memory circuit 625 includes non-volatile (NV) memory 635. In addition, or instead, memory circuit 625 may include volatile memory (not shown), such as random access memory (RAM). NV memory 635 may be used for storing information related to performance, control, or configuration of one or more blocks in IC 550. For example, NV memory 635 may store configuration information related to RF receiver 10 and/or to initial or ongoing configuration or control of RF receiver 10, as desired.

Various circuits and blocks described above and used in exemplary embodiments may be implemented in a variety of ways and using a variety of circuit elements or blocks. For example, digital demodulator 50, MUX 205, controller 210, and divider 215 may generally be implemented using digital circuitry. The digital circuitry may include circuit elements or blocks such as gates, digital multiplexers (MUXs), latches, flip-flops, registers, finite state machines (FSMs), processors, programmable logic (e.g., field programmable gate arrays (FPGAs) or other types of programmable logic), arithmetic-logic units (ALUs), standard cells, custom cells, etc., as desired, and as persons of ordinary skill in the art will understand.

In addition, analog circuitry or mixed-signal circuitry or both may be included, for instance, power converters, discrete devices (transistors, capacitors, resistors, inductors, diodes, etc.), and the like, as desired. Furthermore, oscillator 230, oscillator 240, PLL 235, VCO 225, frequency synthesizer 220, LNA 20, mixer 30, PGA 85, filter 80 include analog circuitry. The analog circuitry in the foregoing circuitry may include bias circuits, decoupling circuits, coupling circuits, supply circuits, current mirrors, current and/or voltage sources, filters, amplifiers, converters, signal processing circuits (e.g., multipliers), detectors, transducers, discrete components (transistors, diodes, resistors, capacitors, inductors), analog MUXs and the like, as desired, and as persons of ordinary skill in the art will understand. The mixed-signal circuitry may include analog to digital converters (ADCs), digital to analog converters (DACs), etc.) in addition to analog circuitry and digital circuitry, as described above, and as persons of ordinary skill in the art will understand. The choice of circuitry for a given implementation depends on a variety of factors, as persons of ordinary skill in the art will understand. Such factors include design specifications, performance specifications, cost, IC or device area, available technology, such as semiconductor fabrication technology), target markets, target end-users, etc.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to the embodiments in the disclosure will be apparent to persons of ordinary skill in the art. Accordingly, the disclosure teaches those skilled in the art the manner of carrying out the disclosed concepts according to exemplary embodiments, and is to be construed as illustrative only. Where applicable, the figures might or might not be drawn to scale, as persons of ordinary skill in the art will understand.

The particular forms and embodiments shown and described constitute merely exemplary embodiments. Persons skilled in the art may make various changes in the shape, size and arrangement of parts without departing from the scope of the disclosure. For example, persons skilled in the art may substitute equivalent elements for the elements illustrated and described. Moreover, persons skilled in the art may use certain features of the disclosed concepts independently of the use of other features, without departing from the scope of the disclosure.

The invention claimed is:

1. An apparatus, comprising:
a radio-frequency (RF) receiver, comprising:
an analog-to-digital converter (ADC) to convert an analog input signal to a digital output signal in response to an ADC clock signal; and
a frequency generator comprising a single phase locked loop (PLL) to selectively provide either a clock signal to be provided as the ADC clock signal or a signal to be used for in-phase-quadrature (IQ) calibration of the RF receiver.

2. The apparatus according to claim 1, wherein the ADC comprises a delta sigma ADC.

3. The apparatus according to claim 1, wherein the clock signal is provided to a first input of a multiplexer (MUX), and wherein an output of the MUX provides the ADC clock signal to the ADC.

4. The apparatus according to claim 1, wherein the signal to be used for IQ calibration of the RF receiver is provided to a low noise amplifier (LNA).

5. The apparatus according to claim 3, wherein a signal derived from an output of a frequency synthesizer in the RF receiver is provided to a second input of the MUX.

6. The apparatus according to claim 5, wherein in response to a select signal the MUX provides either the signal derived from the output of the frequency synthesizer or the clock signal to the ADC as the ADC clock signal.

7. The apparatus according to claim 5, further comprising a divider coupled to receive an output signal of the frequency synthesizer and provide the signal derived from the output of the frequency synthesizer by dividing a frequency of the output of the frequency synthesizer.

8. The apparatus according to claim 5, wherein a value of the select signal depends on whether the RF receiver operates in a receive mode of operation or in an IQ calibration mode of operation.

9. The apparatus according to claim 6, further comprising a controller to cause the frequency generator to selectively provide either the clock signal or the signal to be used for IQ calibration of the RF receiver by providing the select signal to the MUX.

10. An apparatus, comprising:
a radio-frequency (RF) receiver having a receive mode of operation and an in-phase-quadrature (IQ) calibration mode of operation, the RF receiver comprising:
an analog-to-digital converter (ADC) to convert an analog input signal to a digital output signal; and
a single phase locked loop (PLL) to provide either a clock signal to clock the ADC in the receive mode of operation or a signal to be used for in-phase-quadrature (IQ) calibration mode of operation.

11. The apparatus according to claim 10, wherein the RF receiver selectively operates in the receive mode of operation or in the IQ calibration mode of operation.

12. The apparatus according to claim 10, further comprising a multiplexer (MUX) having a first input coupled to receive a signal derived from an output signal of a frequency synthesizer and a second input coupled to receive the clock signal, the MUX further having an output coupled to provide a signal to clock the ADC.

13. The apparatus according to claim 12, further comprising a controller to control whether the RF receiver operates in the receive mode of operation or in the IQ calibration mode of operation by providing a select signal to the MUX.

14. The apparatus according to claim 13, wherein in the receive mode of operation the controller causes the MUX to provide the clock signal to clock the ADC, and wherein in the IQ calibration mode of operation, the controller causes the MUX to provide the signal derived from the output signal of the frequency synthesizer to clock the ADC.

15. A method of operating a radio-frequency (RF) receiver, the method comprising using a single phase locked loop (PLL) in a frequency generator to selectively provide either a clock signal for an analog-to-digital converter (ADC) to convert an analog input signal to a digital output signal, or a signal to be used for in-phase-quadrature (IQ) calibration of the RF receiver.

16. The method according to claim 15, wherein the ADC comprises a delta sigma ADC.

17. The method according to claim 15, further comprising using a multiplexer (MUX) to selectively provide the clock signal for the ADC.

18. The method according to claim 15, wherein the frequency generator provides the clock signal for the ADC in a receive mode of operation of the RF receiver, and wherein the frequency generator provides the signal to be used for IQ calibration of the RF receiver in an IQ calibration mode of operation of the RF receiver.

19. The method according to claim 17, wherein using the MUX to selectively provide the clock signal for the ADC comprises selectively providing either the clock signal from the single PLL or a signal derived from an output signal of a frequency synthesizer.

20. The method according to claim 19, further comprising using as a local oscillator (LO) signal derived from the output signal of the frequency synthesizer.

* * * * *